United States Patent

Lebrun et al.

[11] Patent Number: 5,473,886
[45] Date of Patent: Dec. 12, 1995

[54] THRUST REVERSER WITH AERODYNAMICALLY COOLED BAFFLE

[75] Inventors: Bertrand Lebrun, Vincennes; Eric Lecossais, Virville; Henriette S. Lemay, Le Havre; Fabrice Metezeau, Le Havre; Laurent G. Valleroy, Le Havre, all of France

[73] Assignee: Societe Nationale d'Etude et de Construction de Moteurs d'Aviation, Paris, France

[21] Appl. No.: 264,155

[22] Filed: Jun. 22, 1994

[30] Foreign Application Priority Data

Jun. 23, 1993 [FR] France ........................... 93 07607

[51] Int. Cl.⁶ ............................. F02K 1/30; B05B 12/00
[52] U.S. Cl. ............................. 60/230; 239/265.29
[58] Field of Search ........................ 60/226.2, 230, 60/262; 239/127.1, 127.3, 265.27, 265.29

[56] References Cited

U.S. PATENT DOCUMENTS

| | | | |
|---|---|---|---|
| 2,847,823 | 8/1958 | Brewer | 239/265.29 |
| 3,660,982 | 5/1972 | Gozlan | 60/230 |
| 3,856,239 | 12/1974 | Leibach | 60/226.2 |
| 4,175,385 | 11/1979 | Nash | 239/265.27 |
| 4,292,803 | 10/1981 | Prior | 60/230 |
| 4,362,015 | 12/1982 | Fage | 60/226.2 |
| 4,581,890 | 4/1986 | Giraud | 239/265.29 |
| 5,284,015 | 2/1994 | Carimali et al. | 60/226.2 |
| 5,372,006 | 12/1994 | Lair | 60/226.2 |

FOREIGN PATENT DOCUMENTS

| | | |
|---|---|---|
| 534815 | 3/1993 | European Pat. Off. . |
| 1542477 | 10/1968 | France . |
| 2197115 | 3/1974 | France . |
| 2456216 | 12/1980 | France . |
| 2551132 | 3/1985 | France . |
| 1542642 | 3/1979 | United Kingdom . |

Primary Examiner—Timothy S. Thorpe
Attorney, Agent, or Firm—Bacon & Thomas

[57] ABSTRACT

A thrust reverser for a turbojet engine is disclosed in which the thrust reverser baffles have one or more deflectors to direct the cold gas flow over an inner surface of the baffles to ensure that the inner surface remains out of contact with the hot gas flow. The deflectors are movably mounted on the baffles such that, when the baffles are in their forward thrust positions, the deflectors are retracted so as to be generally flush with the inner surface of the baffle so as not to interfere with the forward thrust flow of gases. The deflectors may be automatically deployed to their extended positions when the baffles are moved to their reverse thrust positions.

4 Claims, 1 Drawing Sheet

THRUST REVERSER WITH AERODYNAMICALLY COOLED BAFFLE

BACKGROUND OF THE INVENTION

The present invention relates to a thrust reverser for a turbojet engine, more particularly such a thrust reverser having a downstream baffle which deflects the turbojet engine gases and which is aerodynamically cooled.

Turbojet engines are, of course, well known in the art and typically have a hot gas exhaust duct, through which pass hot gases from the combustion chamber, surrounded by a generally annular cold gas duct through which comparatively cold air flows. Both exhaust ducts have downstream ends from which the gas flows emanate. The center, hot gas duct nozzle may be fitted with a mixer to permit mixing of the hot and cold gases issuing from the central duct and the annular duct.

Thrust reversers equipped on such turbojet engines typically comprise movable baffles located adjacent to the downstream ends of the hot and cold gas ducts which are movable into thrust reversing positions wherein the baffles contact the hot and cold gas flows to redirect them to generate reverse thrust. Contact between inner surfaces of the baffles, and the hot and cold gases cause high temperature spots to develop in the baffles. Heretofore, it has been necessary to fabricate the thrust reverser baffles from high temperature resistant, technically complex and costly materials in order to enable the baffles to withstand the high temperatures of the hot spots.

It has been noted that, during reverse thrust flow, the cold gas flow emanating from the generally annular cold flow duct to a certain extent encloses the hot gas flow emanating from the central, hot gas flow duct. This phenomenon protects certain portions of the thrust reverser baffles from the impact of the hot gases. However, the cold gas flow does not prevent certain portions of the baffle from developing high temperature hot spots.

Several solutions have been proposed to eliminate this problem. British Patent 1 542 642 discloses a thrust reverser in which a small wall is placed at an end of the thrust reverser in the gas ejection axis. This wall serves as an incident surface for the hot gas flow impact and serves to reverse the hot gas flow immediately after its exit from the engine nozzle. However, the baffle hot spots have been noted near the outermost limits of the baffles, not at the center of the thrust reverser. Thus, the aforementioned British patent has not achieved a complete solution to the problem.

U.S. Pat. No. 4,362,015 suggests increasing the ratio of the total pressures of the cold gas flow to the hot gas flow by placing movable flaps in the cold flow duct during thrust reversal operation. This concept uses a ratio of the total pressures of the cold gas flow to the hot gas flow of more than 1.2 and relies upon the fact that the cold gas flow entirely encloses the hot gas flow, thereby preventing the hot gas from coming into contact with the inner wall surface of the thrust reverser baffles. Normally, in a standard engine's thrust reversal mode, the ratio of pressures of the cold gas flow to the hot gas flow is approximately 1.1. Thus, the aforementioned U.S. patent requires a higher ratio of 1.2 in order to achieve its purposes. This entails the drawback of shifting or modifying the turbojet engine's operating characteristics and possibly encountering abrupt engine shutdown. Furthermore, should the overall pressure ratios be less than 1.2, the aforementioned patent provides ineffective insulation between the hot gas flow and the thrust reverser baffle.

U.S. Pat. No. 4,581,890 discloses a turbine engine which has controllable devices for inhibiting the device for mixing the hot and cold gas flows in order to protect the thrust reverser baffles from the hot gases.

SUMMARY OF THE INVENTION

A thrust reverser for a turbojet engine is disclosed in which the thrust reverser baffles have one or more deflectors to direct the cold gas flow over an inner surface of the baffles to ensure that the inner surface remains out of contact with the hot gas flow.

The deflectors are movably mounted on the baffles such that, when the baffles are in their forward thrust positions, the deflectors are retracted so as to be generally flush with the inner surface of the baffle so as not to interfere with the forward thrust flow of gases. The deflectors may be automatically deployed to their extended positions when the baffles are moved to their reverse thrust positions.

It has been noted that the cold gas flow emanating from the right and left sides of the annular cold gas duct will contact the inner wall of the thrust reverser baffles such that the hot gases issuing from the central, hot gas duct at a lesser pressure than the cold gases, contacts the cushion of cold gases without passing through the cold gases, thereby preventing contact between the inner surfaces of the baffles and the hot gases. Thus, the baffles are not impacted by the hot gases in a central zone of the thrust reverser.

The hot and cold gases then flow from the central zone towards the outermost edges of the baffles and, cross the flow of cold gases issuing from upper and lower downstream ends of the annular cold flow duct. The cold flow is substantially transverse to the direction of movement of the hot and cold gas flow and will further compress the hot and cold gas flow against the inner surface of the baffle. Such action compresses not only the layer of hot gases, but also the insulating layer of cold gases between the inner surface of the baffle and the layer of hot gases. This compression, in the known prior art devices, makes contact possible between the inner surface of the baffle and the hot gases. Such contact will cause hot spots in the baffles in locations toward the outer ends of the baffles and away from the central zone.

The object of the present invention is to aerodynamically guide the cold gas flow along the inner baffle wall surface in such a manner that it will be retained between the inner surface and the layer of hot gases throughout the inner surface of the baffle. This object can be achieved even for total ratios of the pressures of the cold gas to the pressures of the hot gas of less than 1.2. The object can also be achieved without modifying the engine operation as in the prior art devices.

DETAILED DESCRIPTION OF THE PREFERRED EMBODIMENT

Figure 1:
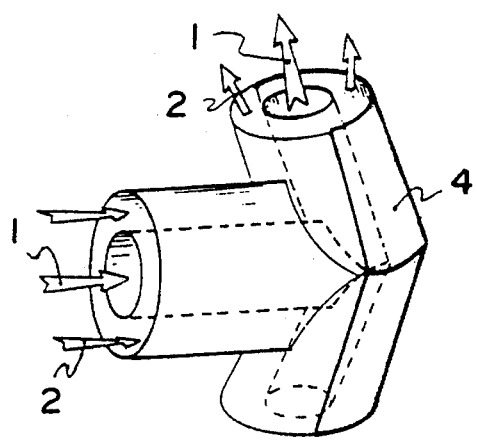
FIG. 1 is a schematic view of the hot and cold gas flows of a bypass-type turbojet engine in the thrust reverse mode.

FIG. 1 is a schematic illustration of the gas flows through a fan-type turbojet engine exhaust wherein the hot gas flow 1 passes through a central duct enclosed by an annular duct through which the cold gas flow 2 flows. In FIG. 1, the baffles 4 are illustrated in their thrust reversing positions wherein the hot and cold gas flows are redirected so as to generate a thrust reversing force.

Figure 2:
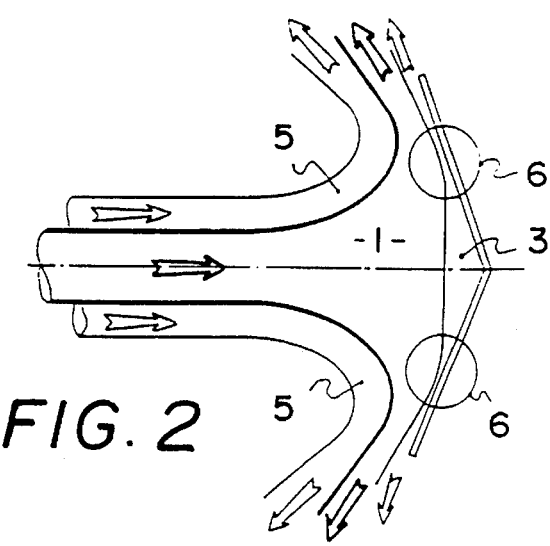
FIG. 2 is a longitudinal, cross-sectional view of the turbojet engine of FIG. 1.
Figure 3:
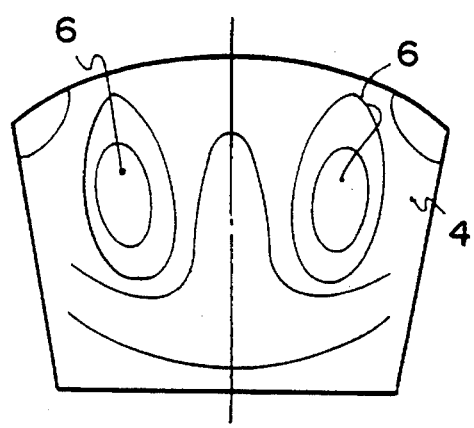
FIG. 3 is a front view of a thrust reverser baffle schematically illustrating the hot zones.

As noted previously, the cold gases flowing along the left and right sides of the annular duct form a cold air pad or cushion 3, as illustrated in FIG. 2, along an inner surface of the baffles 4 to prevent contact between the hot gases 1 and the inner surface of the baffles 4 in a central zone. As the hot and cold gases flow outwardly along the inner surface of the baffles 4, they cross the portions of the cold gas flow flowing along the upper and lower portions of the annular duct, illustrated at 5 in FIG. 2. Such contact causes compression of the cushion of cold gases between the hot gases and the inner surface of the baffles 4 which may cause hot spots or zones 6, illustrated in FIGS. 2 and 3.

Figure 4:
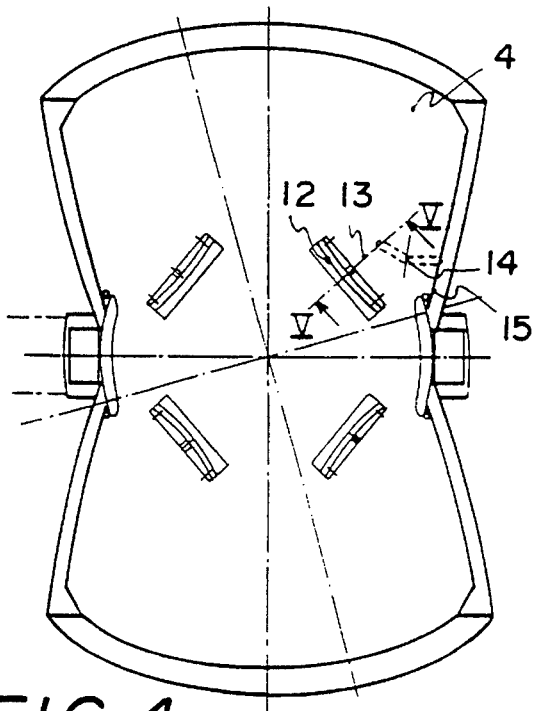
FIG. 4 is a front view of a thrust reverser of the present invention illustrating the baffles in their thrust reversing positions.
Figure 6:
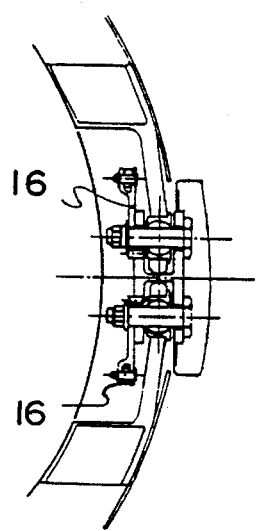
FIG. 6 is a partial, schematic view of the actuating mechanism for the deflectors according to the present invention.
Figure 5:
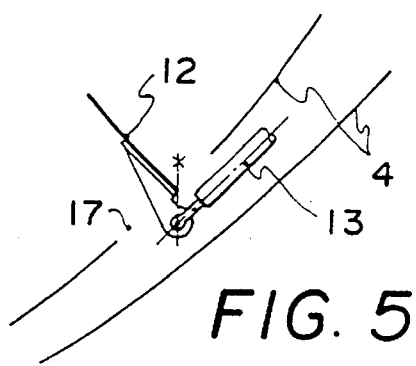
FIG. 5 is a partial, cross-sectional view taken along line V—V in FIG. 4.

In order to guide the cold gas along the inner surface of the baffle to prevent such contact between the inner surface and the hot gases, the present invention proposes mounting retractable deflectors 12 on the baffles 4 as illustrated in FIGS. 4–6. When the thrust reverser baffles are in their forward thrust positions, the deflectors 12 are closed and retracted into the inner wall surface of the baffle 4 so as to be substantially flush with this surface so as to not disturb the aerodynamics of gases flowing through the baffles. When the thrust reversers 4 are moved into their reverse thrust positions, as illustrated in FIG. 4, the deflectors are moved to their open positions in which they guide the flow of cold air adjacent to the inner surface of the baffles 4 so as to avoid impact on the surface by the hot gas flow.

Each deflector 12 is pivotally mounted on the baffle 4 and the movement between the open and closed positions is controlled by a "push-pull" link rod 13 connected to the deflector 12 and to a pivoting link 14 which is pivotally attached to the outer baffle surface. Pivoting movement of the link 14 about its axis is controlled by a "push-pull" link rod 15 which is connected to the pivoting link 14 and to a lever 16 affixed to the turbojet engine frame and located on the axis of the pivot shaft of the baffles 4. Thus, as can be seen, when the baffles 4 open to their thrust reversing positions, the motion of the baffles relative to fixed lever 16 causes lever 16 to pull on link rod 15 which, in turn, rotates the pivoting link 14, thereby pulling the link rod 13 so as to move the deflector 12 to the open position.

The precise number of the deflectors, as well as their positions on the surface of the baffles 4 may, of course, be varied, depending upon the desired bulk of the thrust reverser assembly, as well as their effectiveness in maintaining the cold gas insulating cushion. The optimal number, size and geometry of the deflectors and the baffle are determined in relation to the features of the turbojet engine in which the assembly is utilized, considering the total pressure and the door geometry.

As alternatives to the mechanical linkage drive mechanism illustrated in FIGS. 4–6, the deflectors may be moved between their opened and closed positions by a mechanism using aerodynamic forces such as a pressure at the stop point of thrust reverser in its extended position, exploiting the fact that the flow reverses along the baffle between the forward thrust position and the extended, reverse thrust position.

Additionally, the deflectors 12 may be independently and automatically controlled by a mechanical, hydropneumatic or aeropneumatic system which is independent of the operation of the baffles 4. The deflectors of a given baffle may or may not be ganged with respect to their motions, such interconnection and ganging may be accomplished by mechanical, hydraulic or cable means. Safety systems may also be added to preclude the inadvertent opening of the deflectors 12 when the baffles 4 are in their forward thrust positions.

The retractable deflectors according to the present invention may be used on thrust reversers with downstream baffles of the stationary-pivot type, or of the four-bar type. The surfaces of the baffles and deflectors in contact with the gas flow may be additionally protected by a coating of a thermal resistant material, such as ceramics, or the like.

The foregoing description is provided for illustrative purposes only and should not be construed as in any way limiting this invention, the scope of which is defined solely by the appended claims.

We claim:

1. A thrust reverser for a turbojet engine having an inner, hot gas exhaust duct and an outer, cold gas exhaust duct, the hot gas exhaust duct and the cold gas exhaust duct having downstream ends, the thrust reverser comprising:

a) at least one baffle located adjacent to the downstream ends of the hot and cold gas exhaust ducts and movable between a forward thrust position wherein the hot and cold gases pass out of the downstream ends of their respective exhaust ducts and a reverse thrust position wherein a surface of the at least one baffle extends into contact with the hot and cold exhaust streams so as to redirect the hot and cold exhaust streams into reverse thrust directions;

(b) at least one deflector movably attached to the at least one baffle so as to be movable between a closed position wherein the at least one deflector is generally flush with the surface of the at least one baffle and an open position wherein the at least one deflector extends from the surface and is located to act on gas flow from the cold gas exhaust duct so as to direct at least a portion of the cold flow gases over the surface of the at least one baffle so as to minimize contact between the surface and the hot gas thereby preventing the formation of hot spots on the at least one baffle; and, (c) actuating means to move the at least one deflector to its open position when the at least one baffle is moved to its reverse thrust position, wherein the actuating means comprises:

i) pivot means to pivotally attach the at least one deflector to the at least one baffle;

ii) a lever attached to the turbojet engine:

iii) a first link rod connected to the lever; and, iv) a second link rod connected to the first link rod and to the at least one deflector such that the at least one deflector is moved to its closed position when the at least one baffle is in its forward thrust position and the at least one deflector is moved to its open position when the at least one baffle is moved to its reverse thrust position.

2. The thrust reverser of claim 1 further comprising a plurality of deflectors movably attached to the at least one baffle.

3. The thrust reverser of claim 1 further comprising a plurality of baffles.

4. The thrust reverser of claim 3 further comprising a plurality of deflectors movably attached to each baffle.

* * * * *